UNITED STATES PATENT OFFICE.

JOHN T. ELLIOTT, OF GRAND RAPIDS, MICHIGAN.

WATER-PROOF COMPOUND.

SPECIFICATION forming part of Letters Patent No. 313,412, dated March 3, 1885.

Application filed June 21, 1884. (No specimens.)

*To all whom it may concern:*

Be it known that I, JOHN T. ELLIOTT, of Grand Rapids, in the county of Kent and State of Michigan, have invented a new and useful Improvement in Water-Proof Compounds; and I do hereby declare that the following is a full, clear, and exact description of the same.

My invention is an improved water-proof compound, adapted, also, to preserve the shingles or other surfaces to which it is applied. It is designed, particularly, for the covering of shingle-roofs, but may be used advantageously on metal roofs. In either case it serves to fill all crevices and prevent leaking, and preserves the roof from the action of atmospheric influences.

My compound is made of ingredients as follows: I use coal-tar as a "flow," and with it, to act as a body and "driers," Portland cement, two (2) parts; calcined gypsum, one (1) part; very finely-ground iron ore, two (2) parts; resin, from one-half part to one and one-half part; and ground slate, one-half ($\frac{1}{2}$) part. All these ingredients are proportioned by measure, and are mixed and applied, boiling hot, with an ordinary brush. I prefer to use the resin commonly known as "rosin," which is derived from the distillation of crude turpentine.

The proportions may be varied somewhat. I may omit the calcined gypsum or Portland cement, and still make a good covering; but I prefer the compound with the elements and in the proportions substantially as above described.

I claim—

The above-described compound, consisting of coal-tar, Portland cement, calcined gypsum, iron ore, ground slate, and resin in substantially the proportions specified.

In testimony whereof I have signed my name to this specification in the presence of two subscribing witnesses.

JOHN T. ELLIOTT.

Witnesses:
 N. W. SMITH,
 C. H. SCRIBNER.